United States Patent [19]

Iida

[11] 4,045,132
[45] Aug. 30, 1977

[54] FILM REWINDING DEVICE FOR MOVIE CAMERA

[75] Inventor: Yozo Iida, Komae, Japan

[73] Assignee: Nippon Kogaku, K.K., Tokyo, Japan

[21] Appl. No.: 566,305

[22] Filed: Apr. 9, 1975

[30] Foreign Application Priority Data

Apr. 15, 1974 Japan ............................ 49-40918
May 2, 1974 Japan ............................ 49-48748

[51] Int. Cl.² .............................................. G03B 21/36
[52] U.S. Cl. ....................................... 352/91 C; 352/72
[58] Field of Search ................ 352/91 R, 91 C, 91 S, 352/72 R, 217

[56] References Cited

U.S. PATENT DOCUMENTS

| | | | |
|---|---|---|---|
| 3,246,944 | 4/1966 | Winkler | 352/91 S |
| 3,425,776 | 2/1969 | Mayr | 352/91 S |
| 3,692,395 | 9/1972 | Iida | 352/91 S |
| 3,712,720 | 1/1973 | Winkler | 352/91 S |
| 3,851,956 | 12/1974 | Komine | 352/91 S |
| 3,860,195 | 1/1975 | Holzhauser | 352/72 |

*Primary Examiner*—Monroe H. Hayes
*Attorney, Agent, or Firm*—Shapiro and Shapiro

[57] ABSTRACT

In a film rewinding device for a movie camera which is capable of selective use of both the type A magazine provided with a non-releasable anti-backup mechanism on the exposed film take-up shaft and the type B magazine provided with an externally releasable anti-backup mechanism on the film take-up shaft, the film rewinding device comprises a pin to indicate the type of magazine loaded, and for locking the anti-backup mechanism for the type B magazine, to be released when this type of magazine is loaded; a counting gear to count the film footage of the forward or reverse feed, and a connecting gear. The present device makes it possible to selectively use rewinding patterns possessing the advantages of two types of magazines and to employ special photographing techniques for overlaps, superimposition and reverse shooting, in suitable combination.

12 Claims, 12 Drawing Figures

FILM REWINDING DEVICE FOR MOVIE CAMERA

BACKGROUND OF THE INVENTION

1. Field of the Invention

This invention relates to a film rewinding device for movie cameras in which two different types of film magazines can be used selectively.

2. Description of the Prior Art

Generally, in film magazines available on the market for movie cameras, an anti-backup mechanism is provided on the film take-up core to prevent slack of the film in the magazine. A device for rewinding the film of such a magazine (hereinafter referred to as a type A magazine) has been already proposed in Japanese Patent Publication No. 15467/1970. U.S. Pat. No. 3,599,894 and Japanese Patent Publication No. 35238/1970 disclose cameras using a magazine provided with an anti-backup means and arranged such that when a part of the take-up shaft is pushed, said anti-backup means is moved to its inoperative position to allow both forward and reverse rotations (such magazine being hereinafter referred to as a type B magazine).

With the type A magazine, if film is to be removed, it is first advanced by a claw, while the take-up shaft is locked against rotation, and then the film may be rewound by operation of the claw. On the other hand, the type B magazine is so constructed as to allow both forward and reverse rotations of the take-up shaft, so that it is possible to rewind the film without making any forward feed independent of the take-up shaft before such rewind. In this case, the forward and rearward feed is effected by the operation of a claw and the take-up shaft.

Rewinding of the film is a cinematic photographing technique generally used for effecting overlaps, double exposure or reverse photographing. "Overlap" is accomplished by following the steps of a fadeout exposure (forward rotation), a rewind (reverse idle exposure) and a fadein exposure (forward rotation). "Double exposure" is effected by the successive steps of a normal photographing (forward rotation), a rewind and a normal photographing (forward rotation). "Reverse photographing" is effected by the successive steps of an idle feed (forward rotation), a reverse photographing (rewind rotation) and an idle feed rewind (forward rotation). Thus, the length of film rewound is usually determined by the magnitude of forward feed in the stage immediately before an actual rewind. Therefore, in order to accurately reproduce said photographing techniques in practical performances, it becomes necessary to operably associate the rewind counter with the operation in the stage just preceding the actual rewind. Hence, in the following description, when the phase "at the time of rewind" is used, it includes the forward feed in the stage just before the actual rewind. Also, for effecting proper fadein and fadeout when accomplishing a desired overlap, it is necessary to properly change the shutter opening angle and iris aperture.

SUMMARY OF THE INVENTION

An object of the present invention is to provide a film rewinding device for a movie camera which makes it possible to selectively use said two types of magazines and to perform overlap photographing, double exposure, reverse photographing, etc.

Now the present invention is described in detail firstly by way of a first embodiment thereof with reference to the accompanying drawings.

DESCRIPTION OF THE PREFERRED EMBODIMENTS

Figure 1:
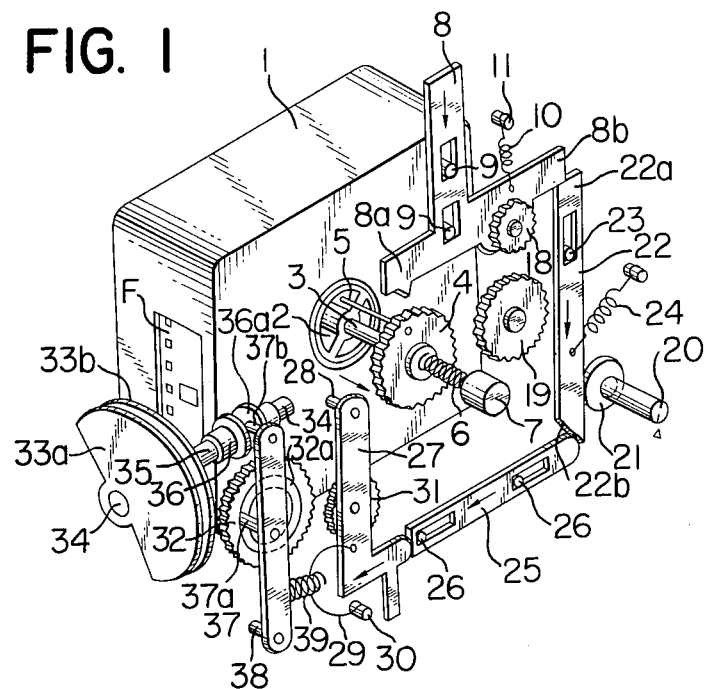
FIGS. 1 to 3 are perspective views showing the first embodiment of the present invention.
Figure 2:
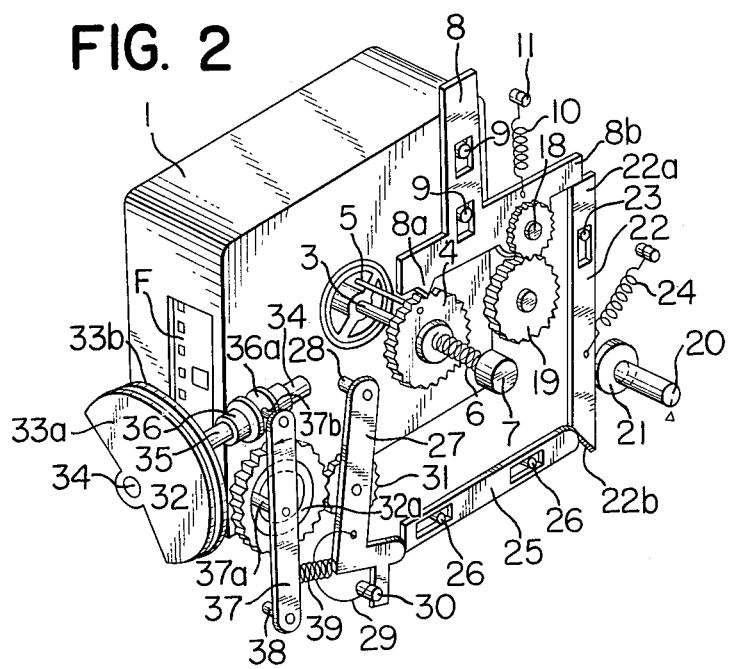
Figure 3:
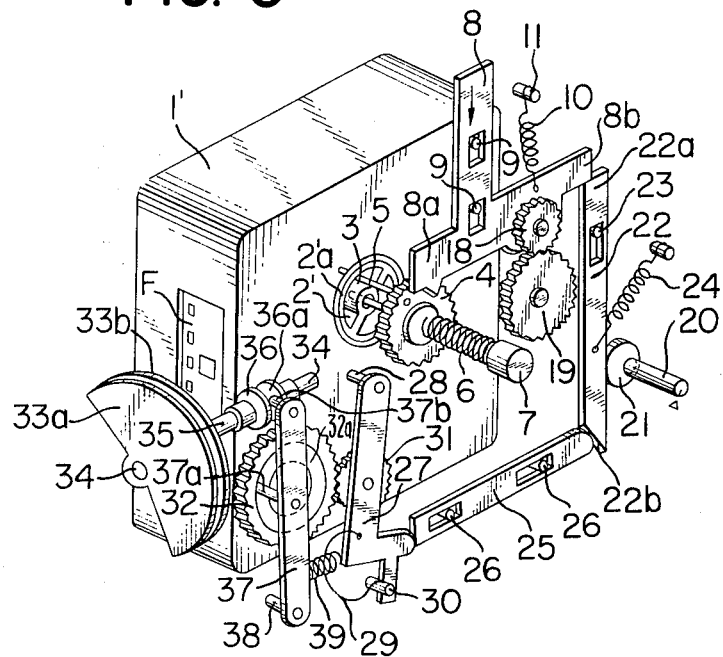

Referring to FIGS. 1 to 3, there are shown perspective views of a film rewinding device according to the first embodiment of the present invention, with FIGS. 1 and 2 showing the device loaded with a type A magazine and FIG. 3 showing the device loaded with a type B magazine.

In the figures, reference numeral 1 denotes a type A magazine which is interiorly divided into a supply chamber and a take-up chamber and has a core 2 which is formed integral with a take-up shaft core (not shown) in a known way. F designates a film and 3 a detector member which, in the instant embodiment, is adapted to serve as a releasing means for bringing the backup means of the type B magazine into its non-operative position. Said detector member 3 is engaged at its one end with the film magazine core 2 and carries at its other end a winding (magazine driving) gear 4 adapted to transmit the driving force of a motor (not shown). Said winding gear 4 absorbs and mitigates load variation of the film take-up shaft through intermittent rolling movement of the film or by other means, and is engaged with a friction spring or other like means, not shown, for allowing smooth take-up of the film without applying any excess strain to the film.

Secured to said winding gear 4 is a take-up pin 5 which is engaged with said core 2 to transmit rotation of said motor to the take-up shaft core in the film magazine. Numeral 6 indicates a compression spring supported by a pin 7 integral with the body portion of the camera and pressing said detector member 3 and winding gear 4 toward the film magazine. Numeral 8 denotes a control member interlocked with a film rewind button (not shown) which is operated from the outside when rewindng the film. Said control member 8 has an engaging portion 8a engageable with said winding gear 4 and another engaging portion 8b adapted for transmitting an operation signal to the rewind counter (not shown) and shutter opening angle adjusting mechanism. The control member 8 is movable vertically by means of guide pins 9. Numeral 10 is a spring for pulling said control member 8 upwardly, and 11 a pin for anchoring said spring 10 at one end. Both guide pins 9 and spring anchoring pin 11 are secured to the camera body. Numeral 18 is a connecting gear for transmitting rotation of the motor to the rewind counter system, the gear being rotatably mounted upon the engaging portion 8b of the control member 8, and 19 is a counter gear provided in the rewind counter system in meshed relation with said connecting gear 18 for operating the rewind counter (not shown). The rewind counter may be of a type in which when forward film feed (in the case of overlap) has reached a given footage the motor switch is turned off or forward rotation is automatically switched into reverse rotation, or of a type in which when a predetermined length of film is rewound, the motor switch is turned off or reverse rotation is switched into forward rotation.

Numeral 20 is a switchover member for switching the photographing mode between overlap photographing and double exposure photographing, 21 a cam plate attached to said switchover member 20, and 22 a first connecting member which is engaged at its one end 22a with the engaging portion 8b of said control member 8 and arranged to be movable vertically, with said cam plate 21 and a guide pin 23 acting as guides. The lower end 22b of said first connecting member 22 is bevelled as shown. Numeral 24 is a spring for biasing said first connecting member 22 upwardly and against said cam plate 21. Numeral 25 indicates a second connecting member engageable with the bevel 22b of said first connecting member 22 and movable sidewise guided by means of guide pins 26. Interlocked with said second connecting lever 25 is a clutch lever 27 arranged to be biased in two directions about a pivot 28 secured to the camera body by means of a known toggle spring 29. Numeral 30 indicates a pin designed to serve both as an anchoring means for said toggle spring 29 and as a stop for said clutch lever 27. Numeral 31 is a ratchet type clutch gear adapted to transmit only the forward drive of the motor to an opening angle adjusting gear 32 which is to be described later. This clutch gear 31 is rotatably supported on said clutch lever 27. The opening angle adjusting gear 32 is formed with an eccentric groove 32a. Reference numerals 33a and 33b designate respectively a first sector and a second sector which, in combination, constitute an opening angle variable shutter unit. Numeral 34 is a motor-operated shutter driving shaft to which said first sector 33a is secured and which is provided with a lead groove (not shown). Said shutter drive shaft 34 is sheathed loosely by a sleeve 35 to which said second sector 33b is secured and which is provided with a straight drive guide groove (not shown). Fitted on said loose sleeve 35 is a slide ring 36 which has provided in its inside a guide pin (not shown) engaged in said straight drive guide groove and lead groove. Numeral 37 is an opening angle adjusting lever having a pin 37a engaged in the eccentric groove 32a on said opening angle adjusting gear and a pin 37b engaged in a circular groove 36a on said slide ring 36, said lever 37 being arranged rockably horizontally about a pivot 38. Supported by said opening angle adjusting lever 37 is a coil spring 39 adapted to bias said clutch lever 27 to the right hand direction. Elements 20 through 39 constitute, in combination, a shutter opening angle adjusting mechanism.

In FIG. 3, numeral 1' designates a B type magazine, and 2' the core thereof which is formed integrally with the take-up shaft core, but its portion 2'a opposed to said detector and releasing member 3 is hollowed and a part of the anti-backup means (not shown) is placed in the hollow. When the part of the anti-backup means in said hollow is pushed into the film magazine by the releasing member 3, said anti-backup means is made inoperative.

Now the operation of the device according to the first embodiment of the present invention will be described concerning the type A magazine and type B magazine, respectively.

1. In the case of type A magazine (see FIGS. 1 and 2)

When the type A magazine is loaded in place, the detector member 3 is pushed in the direction of the associated arrow by a protuberance at the center of the core 2, and the winding gear 4 and control member 8 are positioned on the same plane (this position is called the first position of the detector member 3). FIG. 1 shows this condition, under which normal photographing (forward rotation) can be carried out.

The film rewinding operation for effecting overlap photographing is performed in the following way. First the change-over member 20 is set at OVERLAP, whereby the cam 21 is engaged at its greatest diameter portion with the first connecting member 22. Then the film rewind button (not shown) is pushed, whereby the control member 8 is pushed in the direction of the associated arrow in the figure against the bias of spring 10, and the connecting gear 18 is meshed with the rewind counter gear 19, while the engaging portion 8b presses the first connecting member 22 in the direction of the associated arrow (that is, downwardly). The second connecting member 25 is also pushed in the direction of the associated arrow (that is, to the left) by the bevel 22b of the first connecting member to let the clutch lever 27 turn clockwise. When said clutch lever 27 arrives at a certain point, it is then quickly turned by the toggle spring 29 and the clutch gear 31 is meshed with the opening angle adjusting gear 32. In the meanwhile, the engaging portion 8a *A*of the control member 8 is engaged with the winding gear 4 and maintained lack at this position. (This position is called the second position of the control member 8). FIG. 2 shows this condition, under which fadeout photographing (forward shooting) can be started. The take-up shaft of the magazine (type A) won't be rotated and hence the film F is loosely fed into the take-up chamber by a claw (not shown). The driving force of the motor is transmitted by the connecting gear 18 and counter gear 19 to the rewind counter (not shown) whereby the forward film feed is counted. The driving force of the motor is also transmitted to the opening angle adjusting gear 32 by the clutch gear 31. The opening angle adjusting lever 37 is turned in the direction of the associated arrow with rotation of the eccentric groove 32a of said opening angle adjusting gear 32, and the slide ring 36 is moved in the same general direction by the pin 37b. The second sector 33b is turned by the known mechanism consisting of the guide pin in the slide ring 36, straight drive guide groove in the loose sleeve 35 and lead groove in the shutter driving shaft 34, and thereby the opening angle of the sectors (33a, 33b) is gradually reduced until the opening is fully closed, whereupon the motor is stopped. Thus, when the opening angle adjusting gear 32 turns 180°, fadeout photographing is completed, and then the motor forward-reverse change-over switch (not shown) is turned to the reverse side to perform rewinding of the film.

The film loosely fed into the take-up chamber during fadeout photographing (such length being counted and indicated by the rewind counter) is returned into the supply chamber by said claw. During this time, the shutter opening remains fully closed as the clutch gear 31 is locked against reverse rotation.

Then said motor change-over switch is turned to the forward side and said rewind button is returned to its normal position. As the control member 8 returns to its original position by the action of the spring 10, the first connecting member 22 is also returned to its original position by the spring 24. The clutch lever 27, however, remains biased in the left direction in the drawing by the toggle spring 29. Also, the engaging portion 8a of the control member moves away from the winding gear 4 and the connecting gear 18 from the counter gear 19. (The position taken by the control member 8 at this time is called the first position of the control member). The fadein photographing (forward photographing) can be performed under this condition. In this case, the film F is wound up by the operation of said claw and take-up shaft while the driving force to the motor is transmitted to the opening angle adjusting gear 32 by the clutch gear 31, so that the pi 37b which has been positioned at the left end of the drawing is now driven to the right. Consequently, the second sector 33b is turned by the mechanism constituted by the lead groove, straight drive guide groove and guide pins, so that the opening angle is gradually enlarged until it reaches the fully opened position. Rotation of, the opening angle adjusting gear 32 will have returned the opening angle adjusting lever 37 to its original position before rewinding, the coil spring 39 urging the clutch lever 27 to turn counter-clockwise, and said clutch lever 27 being brought back to its original position (before rewinding) by the action of the toggle spring 29. Consequently, the clutch gear 31 is disengaged from the opening angle adjusting gear 32 and the motor is stopped with the sectors fully opened. Fadein photographing is accomplished in this way; thus overlap photographing is completed.

Now the operation at the time of film rewind for effecting double exposure photographing is described. The change-over member 20 is switched from OVERLAP to Double Exposure. As the first connecting member 22 is engaged with the smallest diameter portion of the cam plate 21, the lower end 22b of said connecting member is disengaged from the second connecting member 25. (In the case of overlap, the first connecting member is engaged with the largest diameter portion of the cam plate). Therefore, the shutter opening angle remains fully opened. The ensuing operations other than that of the shutter opening angle adjusting mechanism are the same as those for overlap photographing.

2. In the case of type B magazine (see FIG. 3)

When the type B magazine is loaded in place, the anti-backup means is disabled into the magazine by the detector member 3 biased by the spring 6. At this time, the winding gear 4 and control member 8 are not on the same plane as they were previously. (This position is called the second position of the detector member 3).

The film rewinding operation for attaining overlap photographing will first be discussed. The change-over member 20 is set at OVERLAP as in the case (1) of the type A magazine. When the rewind button (not shown) is pushed, the control member 8 is forced in the direction of the associated arrow to assume the second position. The winding gear 4 is maintained rotatable at this position. Also, the connecting gear 18 is meshed with the counter gear 19 and the engaging portion 8b of the control member 8 pushes the first connecting member 22 to actuate the rewind counter and shutter opening angle adjusting mechanism in the same way as in the case of the type A magazine described in (1) above. Since the winding gear 4 remains rotatable, film feed for fadeout photographing can be accomplished by the joint operation of said winding gear and claw.

Then the motor rotation change-over switch (not shown) is turned to the reverse position to rewind the film. Unlike the case of the type A magazine, the film fed into the take-up chamber during fadeout photographing (such amount being counted and indicated by the rewind counter) can be returned into the supply chamber by means of said winding gear 4 and the claw. The shutter opening is kept fully closed as in the case of the type A magazine. The ensuing fadein photographing (forward photographing) can be accomplished by the same operation as in the case of the type A magazine described in (1) above.

Double exposure photographing can be accomplished by performing the same operation after setting the change-over member 20 at Double Exposure. When performing rewind of the film, switch-over from forward to reverse rotation can be accomplished by dint of winding gear 4 and the claw as in the case of overlap, without making any shutter opening angle adjustment.

For reverse photographing, the change-over member 20 is set at Double Exposure for the both type A magazine and type B magazine. The forward film movement is an idle feed and the photographing is performed during reverse feed.

In case overlap photographing is not required, all of the members constituting the shutter opening angle adjusting mechanism 20 – 39 except for the sector members 33a, 33b and 34 are unnecessary, but if the change-over member 20 and other associated elements are eliminated, it becomes impossible to perform double exposure photographing or reverse photographing.

Figure 4:
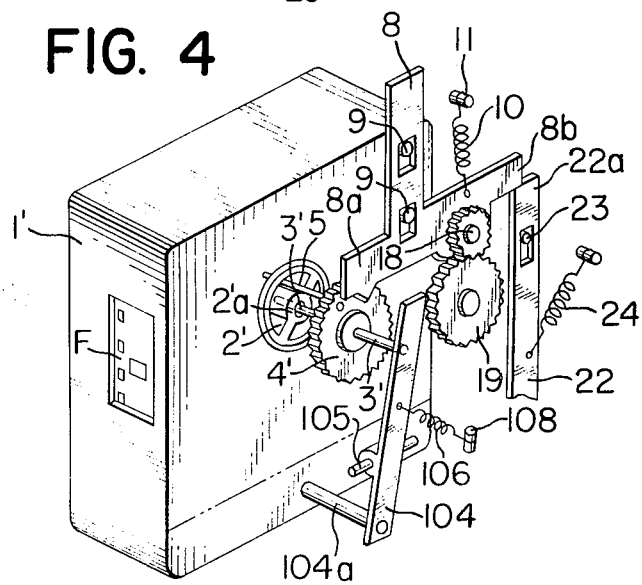
FIG. 4 is a perspective view showing the second embodiment of the present invention.

The type A magazine and type B magazine which are available on the market are slightly different in size, that is, the type B magazine in which the anti-backup means can be made inoperative is larger than the type A magazine. The second embodiment of the present invention which is described hereinbelow is designed to allow selective use of a rewinder device that suits either of the two types of magazine used. This second embodiment is now described with reference to FIG. 4 which shows a condition of the device loaded with a type B magazine, with the double-dotted chain line showing the size of the type A magazine. In the figure, the reference numerals corresponding to those in FIGS. 1 to 3 designate the corresponding elements.

Reference numeral 3' indicates a release means on which a winding gear 4' is rotatably mounted, and numeral 104 designates a detector member which is urged by a spring 106 so as to turn clockwise about a pivot 105 and which is also provided with a detecting pin 104a arranged to be engaged with the magazine only when the magazine (of type B in this case) is loaded in place. Thus, in this second embodiment of the invention, the detector member and the release means are independently formed as separate parts.

1'. In the case of type A magazine

The magazine 1' is unable to engage with the detecting pin 104a of the detector member 104, so that said detector member 104 is urged to turn clockwise by the spring 106, allowing the release means 3' to move toward the body portion of the camera (away from the magazine). Thus, the release means 3' is moved toward the body of the camera by the core 2 of the magazine 1' and the winding gear 4' stays on the same plane as the control member 8. (Of course, stop means, not shown, is provided to limit movement of the release means 3' and detector member 104). Therefore, when the rewind button is pushed, the engaging portion 8a of the control member is meshed with the winding gear 4'. The ensuing operations for rewind are the same as those in the first embodiment.

2. In the case of type B magazine (see FIG. 4)

As the lower part of the magazine 1' pushes the detecting pin 104a, the anti-backup means is rendered inoperative by movement of the release means 3' in the magazine and the winding gear 4 is displaced from its position on the same plane as the control member 8. The ensuing operations for rewind are the same as those in the first embodiment.

Although the elements 20 through 39 in the first embodiment are omitted from the drawings of the instant embodiment, it will be apparent that these elements 20 through 39 can be utilized in the original form in this second embodiment for effecting overlap photographing or double exposure photographing as desired.

Figure 5:
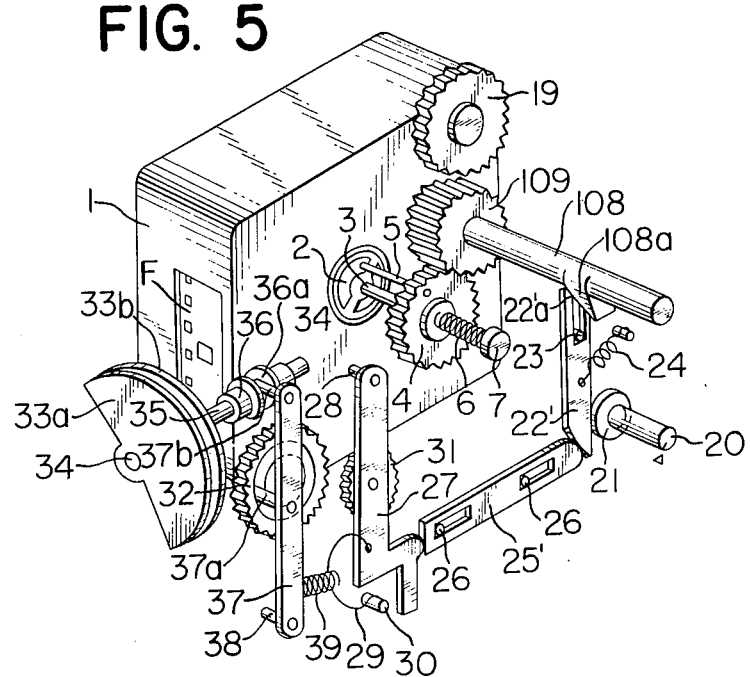
FIGS. 5 to 7 are perspective views showing the third embodiment of the present invention.
Figure 6:
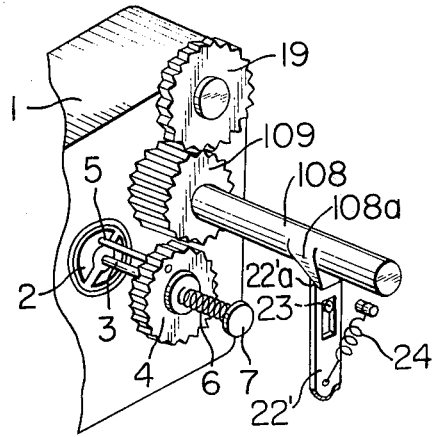
Figure 7:
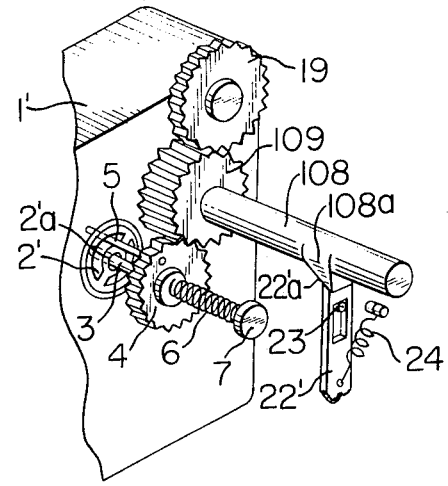

The present invention is now further discussed by way of its third embodiment with particular reference to FIGS. 5 to 7. FIGS. 5 and 6 show the device loaded with a type A magazine and FIG. 7 shows the device loaded with a type B magazine, and in these figures, the reference numerals corresponding to those used in FIGS. 1 to 4 designate the corresponding parts. Numeral 22' indicates the first connecting member and 25' the second connecting member. The upper end 22'a of said first connecting member 22' is bevelled as shown. Numeral 108 denotes a control member which corresponds to the control member 8 in the above-described first and second embodiments. This control member 108 has an engaging portion 108a which is engaged with the bevel 22'a of said first connecting member to push down said member 22'. At one end of said control member 108 is rotatably mounted a connecting gear 109 adapted to transmit the driving force of the motor to the winding gear 4 on the detector member 3 and to the counter gear 19 in the rewind counter system. This control member is also slidable in the axial direction in guide means (not shown). It will be noted that said connecting gear 109 can concurrently play the roles of the connecting gear 18 in the first embodiment and of the gear for transmitting motor drive to the winding gear 4.

1. In the case of type A magazine (FIGS. 5 and 6)

The detector member 3 takes the first position in the same way as in the aforesaid first and second embodiments, and the connecting gear 109 is arranged such that it is meshed at the right end of its toothed face (that is, at the end of the toothed face remote from the magazine) with the winding gear 4 on the detector member 3 to transmit the drive force of the motor. During this time, said connecting gear 109 is not meshed with the counter gear 19. FIG. 5 shows this condition, under which normal photographing can be carried out.

For rewinding the film, the rewind button (not shown) is pushed to move the control member 108 from its first position to the second position, whereby said connecting gear 109 is disengaged from the winding gear 4 and meshed now with the counter gear 19. Also, the first connecting member 22' is pushed down by the engaging portion 108a of said control member to let the clutch gear 31 mesh with the opening angle adjusting gear 32, all in the same way as seen in the first and second embodiments. Such situation is shown in FIG. 6. The ensuing operations for rewind of the film are the same as those in the first and second embodiments described before.

2. In the case of type B magazine (FIG. 7)

As the anti-backup means is rendered inoperative by the release and detector member 3, said release and detector member takes the second position as in the case of the first and second embodiments. Accordingly, the winding gear 4 is meshed with the connecting gear 109 at (or near) the left end thereof. The connecting gear 109 is of course not yet meshed with the counter gear 19. Normal photographing (forward shooting) can be performed under this condition.

When it is desired to rewind the film, the rewind button is pushed to move the control member 108 from the first to the second position, whereby the winding gear 4 is meshed with the connecting gear 109 at (or near) the right end of its toothed face, while the counter gear 19 is also meshed with said connecting gear 109 at (or near) the left end of its toothed face as shown in FIG. 7. Also, the component elements 20 through 39 of the shutter opening angle adjusting mechanism are driven into the operative condition by the engaging portion 108a of the control member 108 as in the case of the type A magazine. The ensuing operations for rewind of the film are the same as in the first and second embodiments.

Figure 8:
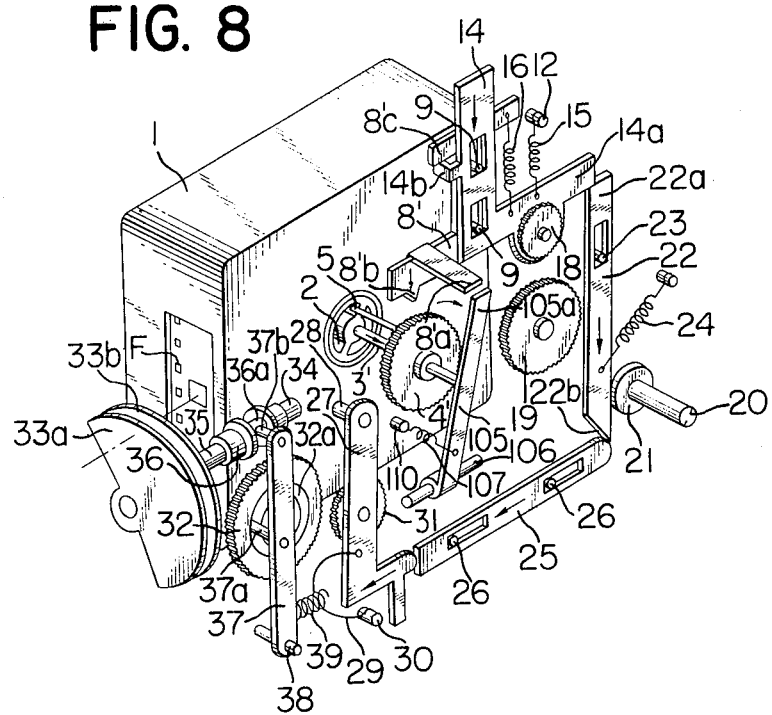
FIGS. 8 to 10 are perspective views showing the fourth embodiment of the present invention.
Figure 9:
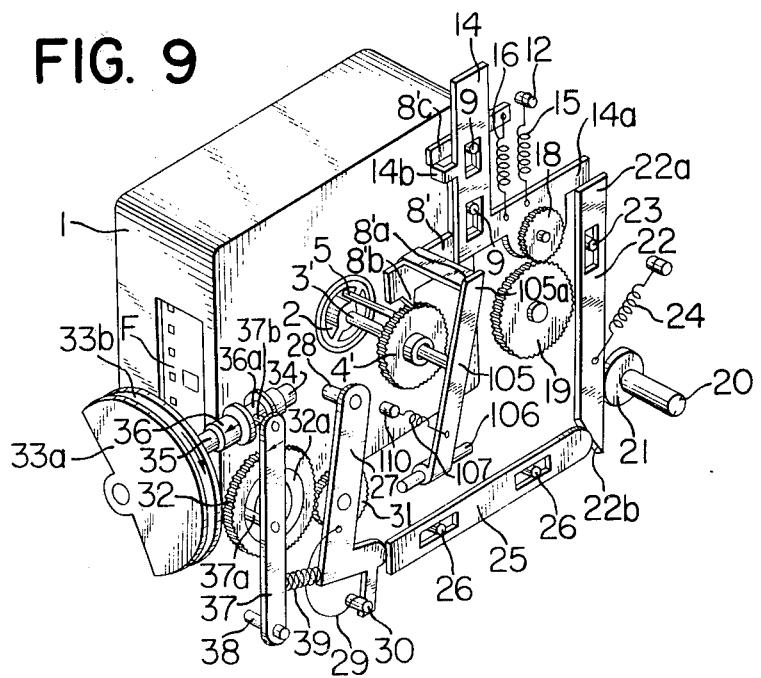
Figure 10:
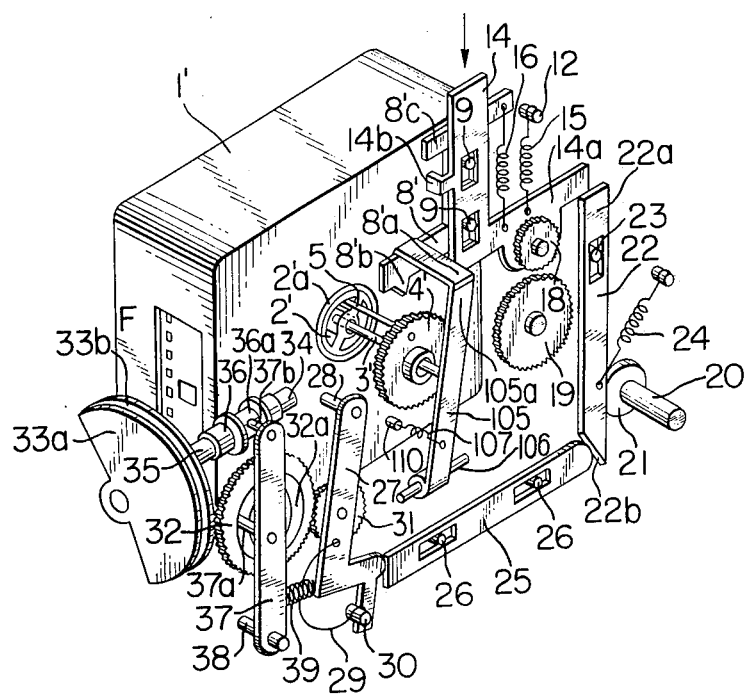

Referring now to FIGS. 8 to 10, there is illustrated the fourth embodiment of the present invention. FIGS. 8 and 9 show the device loaded with a type A magazine and FIG. 10 shows the device loaded with a type B magazine, and in these figures the reference numerals corresponding to those used in FIGS. 1 – 7 designate corresponding parts.

Numeral 105 denotes a stop member which is rockably supported by a shaft 106 secured to the body portion of the camera (not shown) and which is also biased toward the magazine by a spring 107. Numeral 110 denotes a pin secured to the body portion and arranged to anchor one end of said spring 107. The detector member 3', which is designed to concurrently serve as a release member, is engaged at its one end with said stopper member 105 and biased toward the magazine by said spring 107.

The control member 8' controls rotation of the winding gear 4'. This control member has a first engaging portion 8'a engageable with an end 105a of the stop member 105, a second engaging portion 8'b engageable with the winding gear 4' and a third engaging portion 8'c engageable with a rewind interlocking member 14 to be described later, and is movable vertically by means of guide pins 9. The rewind interlocking member 14 has a portion 14a for delivering the operating signal to the rewind counter system (not shown) or the shutter system when rewinding the film, and a protuberance 14b engageable with the third engaging portion 8'c of said control member 8'. It is connected with the rewind button (not shown) operable from the outside when rewinding the film and is movable vertically by means of guide pins 9 just like said control member 8'. Numeral 15 denotes a spring adapted to pull said rewind interlocking member 14 upwardly, numeral 16 a connecting spring which connects said control member 8' and rewind interlocking member 14, and 18 a gear journalled in said interlocking member 14 and adapted to convey the drive force of the motor to the rewind counter system. 19 denotes a counter gear for the rewind counter system (not shown). The counter gear 19 is engageable with said gear 18. The rewind counter may be either of a type in which when a predetermined forward feed (in the case of overlap) has been attained, the motor switch is turned off or the forward feed is automatically switched to reverse feed, or of a type in which when a predetermined length of film has been rewound, the motor switch is turned off or the reverse feed is switched to forward feed.

The above-described fourth embodiment of the present invention will now be further discussed concerning its use with a type A magazine and a type B magazine, respectively.

1. Use with a type A magazine (FIGS. 8 and 9)

FIG. 8 shows the setup of the mechanical parts for normal (forward) photographing and FIG. 9 shows that for rewind of the film. When a magazine 1 (type A) is loaded in position, the detector member 3' is pushed in the direction of the associated arrow by a protuberance at the center of the magazine core 2, causing the stop member 105 to turn clockwise about the shaft 106 against the force of the spring 107, with the end 105a of said stop member moving away from the path of the first engaging portion 8'a of the control member 8a. Under this condition, forward (normal) photographing can be carried out.

Let us now discuss the film rewinding operation for effecting overlap photographing. FIrst, the change-over member 20 is set at OVERLAP. (The cam plate 21 is engaged at its greatest diameter portion with the first connecting member 22). Then the rewind button (not shown) is pushed, whereby the rewind interlocking member 14 is pressed in the direction of the associated arrow against the force of spring 15 to let the connecting gear 18 mesh with the counter gear 19 of the rewind counter system, while the first connecting member 22 is pushed in the direction of the associated arrow (that is, downwardly) by the engaging portion 14a of said member 14. The second connecting member 25 is also forced in the direction of the associated arrow (that is, to the left) by the bevel 22b of the first connecting member 22 to turn the clutch lever 27 clockwise. When said clutch lever 27 rotates and arrives at a certain point, it is then quickly turned by the toggle spring 29, allowing the clutch gear 31 to mesh with the opening angle adjusting gear 32.

The control member 8' is interlocked with the rewind interlocking member 14 by means of connecting spring 16, and the second engaging portion 8'b is meshed with the winding gear 4' and maintained at this position. This condition is shown in FIG. 9, and fadeout photographing (forward photographing) strts from this condition. The take-up shaft of the magazine is locked against rotation, and the film F is loosely fed into the take-up chamber (not shown) by means of a claw (not shown). The driving force of the motor is transmitted through the connecting gear 18 and counter gear 19 to the counter, whereby the forward film feed is counted. The driving force of the motor is also transmitted to the opening angle adjusting gear 32 by means of clutch gear 31, and the opening angle adjusting lever 37 is moved in the direction of the associated arrow with rotation of the eccentric groove 32a of said opening angle adjusting gear 32. By the operation of a known mechanism comprising a guide pin in the slide ring 36, a straight drive groove in the loose sleeve 35 and a lead groove in the shutter driving shaft 34, the second sector 33b is turned in the direction of the associated arrow in the drawing to gradually reduce the opening angle until the opening of the sectors is finally fully closed, whereupon the motor operation is stopped.

Thus, fadeout is completed with a 180° turn of the opening angle adjusting gear 32. Thereafter the motor rotation changeover switch (not shown) is turned to the reverse side to effect rewind of the film, and the film which was loosely fed into the take-up chamber (such film length being counted and indicated by the rewind counter) is returned into the supply chamber by dint of said claw. The shutter opening is kept fully closed as the clutch gear 31 is locked against reverse rotation.

The the motor change-over switch is turned to the forward side and the rewind button is returned to its original position. As the rewind interlocking member 14 returns to its original position under the force of spring 15, the control member 8' and first coupling member 22 are also forced back to their original positions by dint of the protuberance 14b of said interlocking member 14 and spring 24, respectively. The clutch lever 27, however, is kept pressed to the left in the drawing by the toggle spring 29. Also, the second engaging portion 8'b of the control member 8' moves away from the winding gear 4' and the connecting gear 18 from the counter gear 19. Fadein (forward photographing) is carried out under this condition. As the film F is fed by the operation of the claw and the take-up shaft and the driving force of the motor is transmitted to the opening angle adjusting gear 32 by the operation of clutch gear 31, the pin 37b which has been positioned at the left end in the drawing is driven in the opposite direction. Therefore, conversely to the operation pattern for reverse photographing, the second sector 33b is turned by the mechanism constituted by the lead groove, straight drive guide groove and guide pins to gradually enlarge the opening angle until it is widened out to the limit. As this stage is reached, the opening angle adjusting gear 32 will have turned 180° to return the opening angle adjusting lever 37 to its original position before rewinding, and also the clutch lever 27 is urged in the counterclockwise direction by the coil spring 39, so that said clutch lever 27 is also returned to its original position before rewinding by the toggle spring 29. Consequently, the clutch gear 31 is disengaged from the opening angle adjusting gear 32 and the motor is stopped upon full opening of the shutter. Fadein is thus completed to accomplish overlap photographing as a whole.

For effecting double exposure photographing, the change-over member 20 is switched from OVERLAP to Double Exposure, whereby the first connecting member 22 is engaged with the smallest diameter portion of the cam plate 21, so that the lower end 22b of said member becomes unable to engage with the second coupling member 25. Therefore, the shutter opening angle won't be changed. The ensuing behaviors of the parts, other than those of the shutter opening angle adjusting mechanism, are the same as in the case of overlap photographing.

2. Use with a type B Magazine (FIG. 10)

When a type B magazine is set in position, the anti-backup means is rendered inoperative by the detector member 3' to release the lock of said inhibitor. Therefore, the end 105a of the stop member stays engaged with the first engaging portion 8'a of the control member 8.

The film rewinding operation for effecting overlap photographing is accomplished in the following way. The change-over member 20 is set at OVERLAP as in the case of the type A magazine described in (1) above, and then the rewind button (not shown) is pushed; whereby the rewind interlocking member 14 is pushed to let the connecting gear 18 mesh with the counter gear 19 while the first connecting member 22 is also pushed by the engaging portion 14a of said interlocking member 14 to operate the rewind counter and shutter opening angle adjusting mechanism, in the same way as in the case of the type A magazine. On the other hand, the control member 8' is checked against movement by the stop member 105, maintaining the winding gear 4' in a rotatable state, so that film feed for fadeout photographing is accomplished by the combined operations of the winding gear and the claw.

Then the motor rotation change-over switch (not shown) is turned to the reverse position to exercise rewinding of the film.

The same amount of film supplied into the take-up chamber (such amount being counted and indicated by the rewind counter) is returned into the supply chamber by dint of the winding gear 4' and claw unlike the case of the type A magazine. The shutter opening angle is kept fully closed as in the case of the type A magazine. The ensuring fadein (forward photographing) operation is also accomplished in the same manner as in the case of type A magazine.

Double exposure photographing can be also accomplished in a similar way by setting the change-over member 20 at Double Exposure. For reverse photographing, the change-over member 20 is set at DOUBLE EXPOSURE, an idle feed is made during forward film movement and photographing is accomplished during reverse feed.

Now the fifth embodiment of the present invention will be described with reference to FIG. 11.

Figure 11:
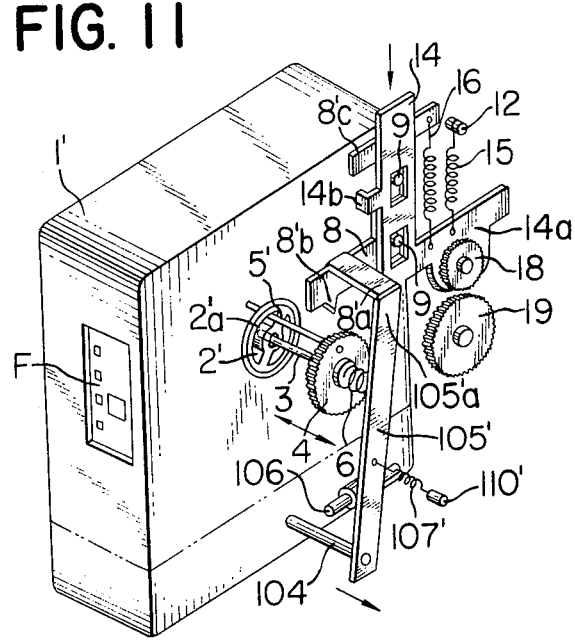
FIG. 11 is a perspective view showing the fifth embodiment of the present invention.

FIG. 11 shows the mechanical setup of the device loaded with a type B magazine, with the double-dotted chain line indicating the size of the type A magazine, and in the figure, the reference numerals corresponding to those in FIGS. 1 to 10 designate the corresponding parts.

Numeral 105' indicates a stop member which is urged by a spring 107' to turn in a direction opposite to that of the stop member 105 of the fourth embodiment, that is, clockwise about a pivot 106. Numeral 110' denotes a pin secured to the body portion of the camera for anchoring an end of said spring 107', and numeral 104 denote a detector member secured to said stop member 105'. Numeral 3 denotes a release pin adapted for de-activating anti-backup means, numeral 4 a winding gear mounted on said release pin, and 6 a coil spring which is supported at one end by the camera body (not shown) so as to press said release pin 3 and winding gear 4 toward the film magazine.

1'. When a type A magazine is loaded

Since the maganzine A is unable to engage with the detector member 104, the stop member 105' is placed at position of rotation by the spring 107', so that it can not check downward movement of the control member 8'. Also, the release pin 3 is moved away from the magazine by a central protuberance of the magazine core 2, and the winding gear 4 is positioned on the same plane as the control member 8'. Therefore, if the operator pushes the rewind button, said control member 8' is moved downwardly to check rotation of the winding gear 4. The ensuing operations for rewind of the film are completely the same as in the fourth embodiment.

2'. When a type B magazine is loaded (FIG. 11)

As the detector member 104 is pushed in the direction of the associated arrow by the lower part of the magazine B, the stop member 105' is turned counterclockwise and its end 105'a is engaged with the first engaging portion 8'a of the control member. The release pin 3 de-activates the anti-backup means by its movement into the magazine under the force of the coil spring 6. The ensuing operations for rewind are completely the same as in the fourth embodiment.

In the fourth embodiment the detector member 3' doubles as a release means, like the release pin 3 of the fifth embodiment, but in the fifth embodiment the detector member 104 is integrated with the stop member 105' to let it serve another purpose. Although the elements 20 through 39 in the fourth embodiment are omitted in the drawing, it will be apparent that such elements 20 through 39 are capable of performing overlap photographing or double exposure photographing in the fifth embodiment, too.

Figure 12:
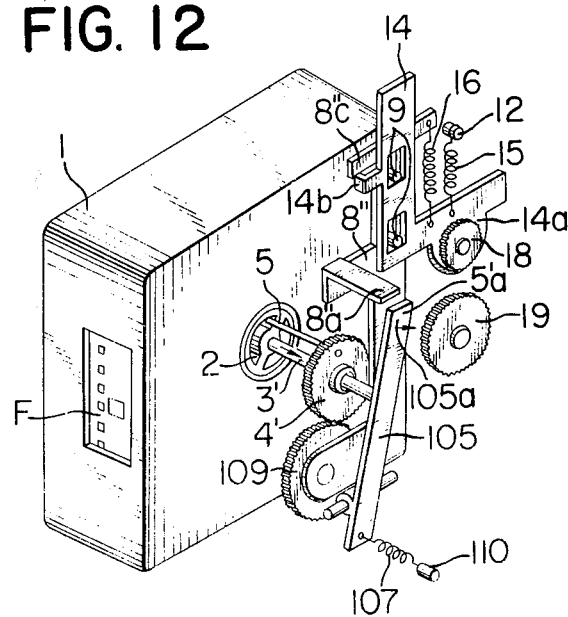
FIG. 12 is a perspective view showing the sixth embodiment of the present invention.

The present invention will now be further described by way of its sixth embodiment with reference to FIG. 12, where the same reference numerals as used in FIGS. 1 through 11 designate the same parts.

Reference numeral 105 denotes a stop member which is urged to turn counterclockwise about a pivot 106 by a spring 107 and arranged to prevent movement of the control member 8", to be described later, by an end 105a thereof. Numeral 110 denotes a pin to which an end of said spring 107 is anchored. Control member 8 rotatably supports on its end a connecting gear 109 which is engageable with both the winding gear 4' and a gear in the motor system. Said control member 8" is connected to rewind interlocking member 14 by a spring 16 or other means as in the fourth and fifth embodiments.

1". In the case of type A magazine (FIG. 12)

As the stop member 105 is pressed by the detector member 3' in the direction of the associated arrow as in the case of the fourth embodiment, the control member 8" is movable vertically. Such condition is shown in FIG. 12. Therefore, in normal (forward) photographing, the rotation of the motor is transmitted to the magazine take up shaft through the coupling gear 109 and winding gear 4', but when rewinding the film, the rotation of the motor is not transmitted to the take-up shaft since the connecting gear 109 is disengaged downwardly from the winding gear 4'. The ensuing operations for rewinding the film are the same as in the above-described fourth and fifth embodiments.

2" . In the case type B of magazine

The anti-backup means is de-activated by the release pin 31 and the stop member 105 remains at its position to check the downward movement of the control member 8". Therefore, the control member 8" won't be moved downwardly even if the rewind button is pushed, so that the driving force of the motor is transmitted to the take-up shaft through the connecting gear 109. Similar operations to those in the fourth and fifth embodiments are performed for rewind of the film.

Although the elements 20 through 39 in the fourth embodiment are omitted in the drawing, it will be apparent that these elements 20 through 39 play active parts in performing overlap photographing or double exposure photographing in the just described sixth embodiment, too.

In the first to third embodiment of the present invention, the rotating direction of the motor is switched from forward to reverse or vice versa manually, but such switchover or on-off operation can be accomplished with ease by use of a rewind counter or shutter opening angle adjusting mechanism as described above. Also, in the foregoing embodiments, fadeout photography and fadein photography are practiced by adjusting the opening angle of the shutter with displacement of the rewind interlocking member, but it is also possible to perform such mode of photographing by interlocking the stop mechanism with said rewind interlocking member. Thus, said rewind interlocking member may be assigned various roles in the photographing operation, such as starting the rewind counter with displacement of said member or operating the mechanism for gradually reducing the shutter opening angle or aperture for making fadeouts.

As described above, it is possible according to the device of the present invention to perform film rewind with use of either a non-reversible type A magazine or a reversible type B magazine by simply loading such magazine in the camera, in the same way as any conventional camera using only a single type of magazine. Also, as a rewind interlocking mechanism is adapted to operate when rewinding the film, various photographing techniques (such as overlap, a double exposure or reverse photographing) can be accomplished with rewind of the film.

I claim:

1. In a motor-driven motion-picture camera which is capable of selective use of both a type A magazine provided with a non-releasable anti-backup device on an exposed film take-up shaft and a type B magazine provided with an externally releasable anti-backup device on said film take-up shaft, and which includes a winding gear rotatable in response to the motor operation and a member secured to said gear for rotating said take-up shaft with rotation of said gear, the improvements comprising:
   a. detector means having a first position upon loading of a type A magazine and a second position upon loading of a type B magazine, so as to detect the type of magazine loaded;
   b. means associated with said detector means for positioning said winding gear at a first position when a type A magazine is loaded and at a second position when a type B magazine is loaded;
   c. means for disabling said anti-backup device for the type B magazine when this type of magazine is loaded;
   d. means including a counting gear for counting the film footage of forward feed and reverse feed during overlap, double exposure and reverse photographing; and
   e. manually displaceable control means including a connecting gear driven by said motor and displaceable from a first position remote from said counting gear to a second position at which said counting and connecting gears mesh for coupling said counting means to said motor and including a winding gear control member displaceable from a first position to a second position for locking said winding gear against winding rotation when said winding gear is at its first position and for permitting winding rotation of said winding gear when said winding gear is at its second position.

2. A motion-picture camera as set forth in claim 1, further including fading means adapted to let the film picture fade in or fade out in response to motor rotation, and wherein said control means actuates means for coupling said motor to said fading means when said connecting gear is at its second position.

3. A motion-picture camera as set forth in claim 2, wherein said fading means comprises means including a shutter opening angle adjusting gear for adjusting the opening angle of a shutter in response to motor rotation, wherein said control means actuates said coupling means via a connecting member which rotatably supports an intermediate gear driven by the motor and which is displaceable from a first position where said intermediate gear is away from said shutter opening angle adjusting gear to a second position where said intermediate gear is meshed with said adjusting gear from transmitting motor rotation to said adjusting gear in response to displacement of said control means.

4. In a motor-driven motion-picture camera which is capable of selective use of both a type A magazine provided with a non-releasable anti-backup device on an exposed film take-up shaft and a type B magazine provided with an externally releasable anti-backup device on said film take-up shaft, and which includes a winding gear rotatable in response to the motor operation and a member secured to said gear for rotating said take-up shaft with rotation of said gear, the improvements comprising:
   a. detector means having a first position upon loading of a type A magazine and a second position upon loading of a type B magazine, so as to detect the type of magazine loaded;
   b. means associated with said detector means for positioning said winding gear at a first position when a type A magazine is loaded and at a second position when a type B magazine is loaded;
   c. means for disabling said anti-backup device for the type B magazine when this type of magazine is loaded;
   d. means including a counting gear for counting the film footage of forward feed and reverse feed during overlap, double exposure and reverse photographing; and
   e. manually displaceable control means including a connecting gear driven by said motor and displaceable from a first position remote from said counting gear to a second position at which said counting and connecting gears mesh for coupling said counting means to said motor, said connecting gear at its first position meshing with said winding gear, said connecting gear at its second position also meshing with said winding gear when said winding gear is at its second position but not when said winding gear is at its first position.

5. A motion-picture camera as set forth in claim 4, further including fading means adapted to let the film picture fade in or fade out in response to motor rotation, and wherein said control means actuates means for coupling said motor to said fading means when said connecting gear is at its second position.

6. A motion-picture camera as set forth in claim 5, wherein said fading means comprises means including a shutter opening angle adjusting gear for adjusting the opening angle of a shutter in response to motor rotation, wherein said control means actuates said coupling means via a connecting member which rotatably supports an intermediate gear driven by the motor and which is displaceable from a first position where said intermediate gear is away from said shutter opening angle adjusting gear to a second position where said intermediate gear is meshed with said adjusting gear from transmitting motor rotation to said adjusting gear in response to displacement of said control means.

7. In a motor-driven motion-picture camera which is capable of selective use of both a type A magazine provided with a non-releasable anti-backup device on an exposed film take-up shaft and a type B magazine provided with an externally releasable anti-backup device on said film take-up shaft, and which includes a winding gear rotatable in response to the motor operation and a member secured to said gear for rotating said take-up shaft with rotation of said gear, the improvements comprising:
- a. detector means having a first position upon loading of a type A magazine and a second position upon loading of a type B magazine, so as to detect the type of magazine loaded;
- b. stop means associated with said detector means and having a first position when a type A magazine is loaded and a second position when a type B magazine is loaded;
- c. means for disabling said anti-backup device for the type B magazine when this type of magazine is loaded;
- d. means including a counting gear for counting the film footage of forward feed and reverse feed during overlap, double exposure of reverse photographing; and
- e. manually displaceable control means including a connecting gear driven by said motor and displaceable from a first position remote from said counting gear to a second position at which said counting and connecting gears mesh for coupling said counting means to said motor and including a winding gear control member displaceable from a first position to a second position for locking said winding gear against winding rotation when said stop means is at its first position, said control member being kept from displacement to its second position by engagement with said stop means at its second position, thereby to permit rotation of said winding gear.

8. A motion-picture camera as set forth in claim 7, further including fading means adapted to let the film picture fade in or fade out in response to motor rotation, and wherein said control means actuates means for coupling said motor to said fading means when said connecting gear is at its second position.

9. A motion-picture camera as set forth in claim 8, wherein said fading means comprises means including a shutter opening angle adjusting gear for adjusting the opening angle of a shutter in response to motor rotation, wherein said control means actuates said coupling means via a connecting member which rotatably supports an intermediate gear driven by the motor and which is displaceable from a first position where said intermediate gear is away from said shutter opening angle adjusting gear to a second position where said intermedate gear is meshed with said adjusting gear for transmitting motor rotation to said adjusting gear in response to displacement of said control means.

10. In a motor-driven motion-picture camera which is capable of selective use of both a type A magazine provided withh a non-releasable anti-backup device on an exposed film take-up shaft and a type B magazine provided with an externally releasable anti-backup device on said film take-up shaft, and which includes a winding gear rotatable by a driving gear in response to the motor operation and a member secured to said winding gear for rotating said take-up shaft with rotation of said winding gear, the improvements comprising:
- a. detector means having a first position upon loading of a type A magazine and a second position upon loading of a type B magazine, so as to detect the type of magazine loaded;
- b. stop means associated with said detector means and having a first position when a type A magazine is loaded and a second position when a type B magazine is loaded;
- c. means for disabling said anti-backup device for the type B magazine when this type of magazine is loaded;
- d. means including a counting gear for counting the film footage of forward feed and reverse feed during overlap, double exposure and reverse photographing; and
- e. manually displaceable control means including a connecting gear driven by said motor and displaceable from a first position remote from said counting gear to a second position at which said counting and connecting gears mesh for coupling said counting means to said motor and including a winding gear control member displaceable from a first position to a second position for moving said driving gear away from said winding gear when said stop means is at its first position, said control member being kept from displacement to its second position by engagement with said stop means at its second position, thereby to permit said driving gear to drive said winding gear.

11. A motion-picture camera as set forth in claim 10, further including fading means adapted to let the film picture fade in or fade out in response to motor rotation, and wherein said control means actuates means for coupling said motor to said fading means when said connecting gear is at is second position.

12. A motion-picture camera as set forth in claim 11, wherein said fading means comprises means including a shutter opening angle adjusting gear for adjusting the opening angle of a shutter in response to motor rotation, wherein said control means actuates said coupling means via a connecting member which rotatably supports an intermediate gear driven by the motor and which is displaceable from a first position where said intermediate gear is away from said shutter opening angle adjusting gear to a second position where said intermediate gear is meshed with said adjusting gear for transmitting motor rotation to said adjusting gear in response to displacement of said control means.

* * * * *